United States Patent [19]

Keshlear William M.

[11] Patent Number: 4,477,871
[45] Date of Patent: Oct. 16, 1984

[54] GLOBAL OPERATION COORDINATION METHOD AND CIRCUIT

[75] Inventor: Keshlear William M., Austin, Tex.

[73] Assignee: Motorola, Inc., Schaumburg, Ill.

[21] Appl. No.: 330,050

[22] Filed: Dec. 14, 1981

Related U.S. Application Data

[63] Continuation-in-part of Ser. No. 324,183, Nov. 23, 1981.

[51] Int. Cl.³ ............................................. G06F 13/00
[52] U.S. Cl. ................................................. 364/200
[58] Field of Search ............................... 364/200, 900

[56] References Cited

U.S. PATENT DOCUMENTS

| | | | |
|---|---|---|---|
| 3,480,914 | 11/1969 | Schlaeppi | 364/200 |
| 4,040,028 | 8/1977 | Pauker | 364/200 |
| 4,153,934 | 5/1979 | Sato | 364/200 |
| 4,223,380 | 9/1980 | Antonaccio et al. | 364/200 |
| 4,236,208 | 11/1980 | O'Keefe et al. | 364/200 |
| 4,363,094 | 12/1982 | Kaul et al. | 364/200 |
| 4,365,295 | 12/1982 | Katzman et al. | 364/200 |
| 4,384,322 | 5/1983 | Bruce et al. | 364/200 |
| 4,384,327 | 5/1983 | Conwag et al. | 364/200 |
| 4,433,376 | 2/1984 | Lombardo, Jr. et al. | 364/200 |

*Primary Examiner*—Gareth D. Shaw
*Assistant Examiner*—Jameson Lee
*Attorney, Agent, or Firm*—Anthony J. Sarli, Jr.; Jeffrey Van Myers

[57] ABSTRACT

A memory management unit of use in a memory management system. The memory management unit selectively maps a logical address to a respective physical address in accordance with a selected one of a plurality of segment descriptors, each of which defines a logical-to-physical address mapping and a range of address spaces for which such mapping is valid. The mapping is achieved using an improved associative memory circuit. Means are provided to detect mapping conflicts between new segment descriptors and segment descriptors already stored, and to prevent the storage of such conflicting segment descriptors. A method and circuit are provided to coordinate the parallel operation of a plurality of the memory management units or the like.

2 Claims, 7 Drawing Figures

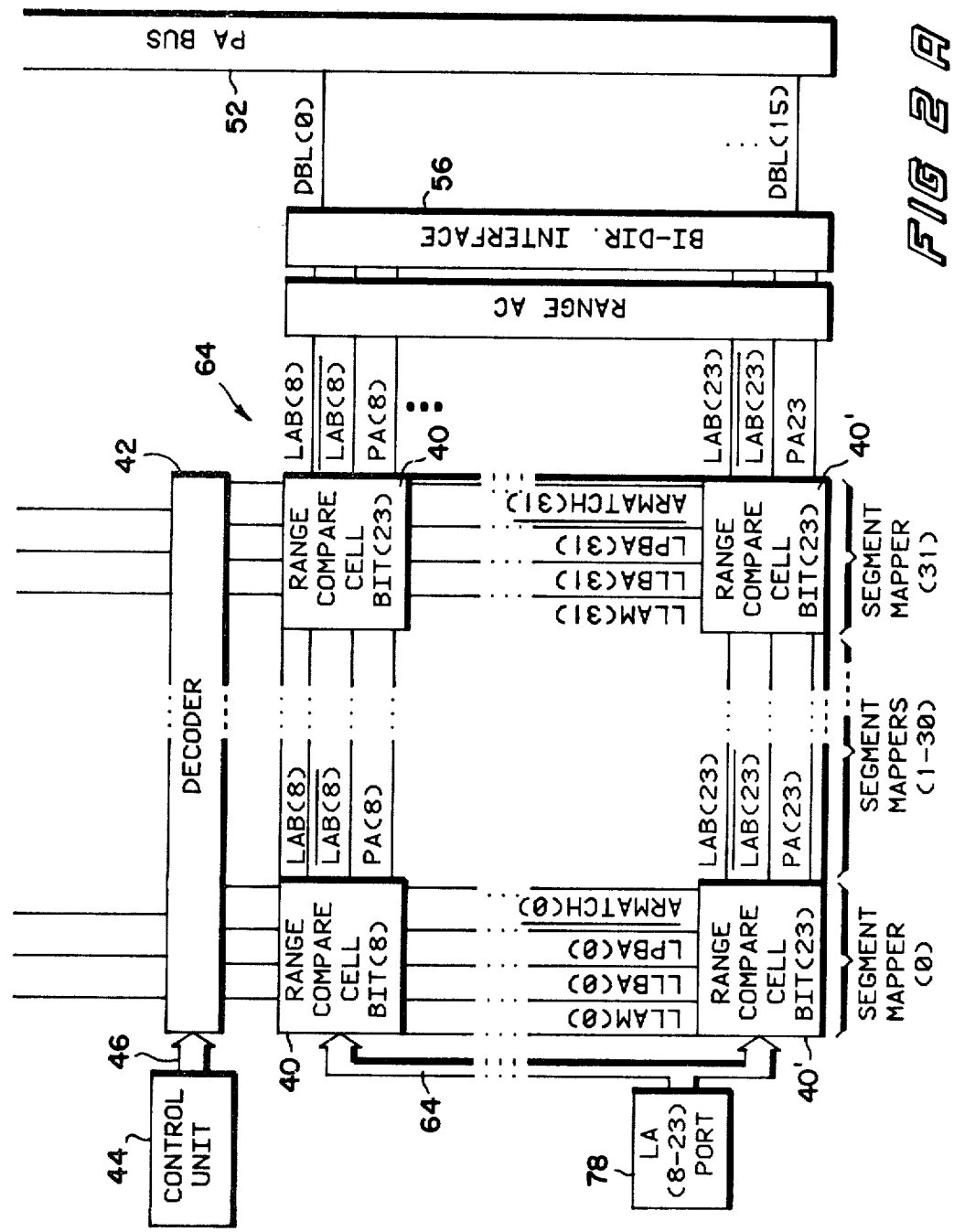

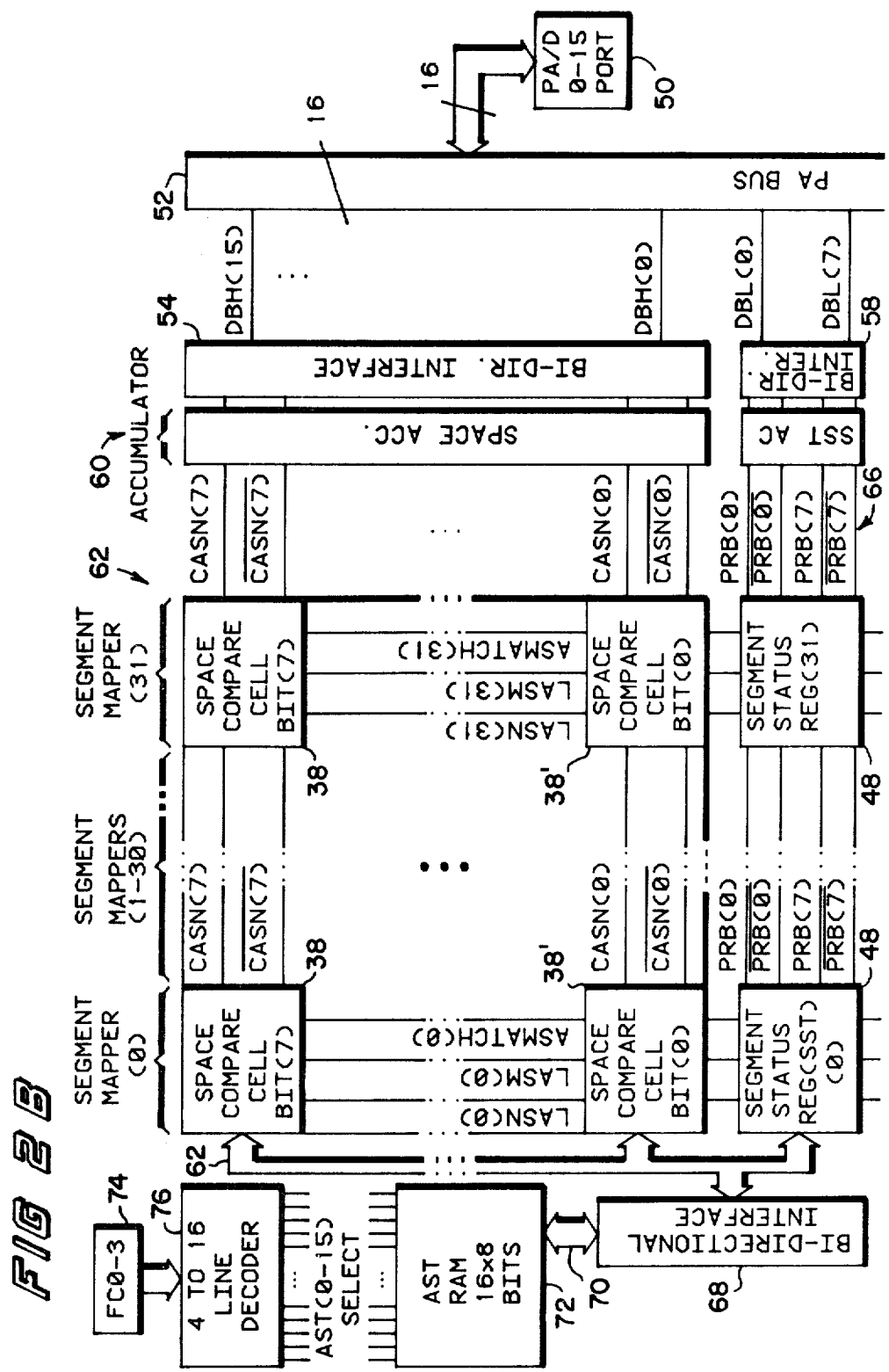

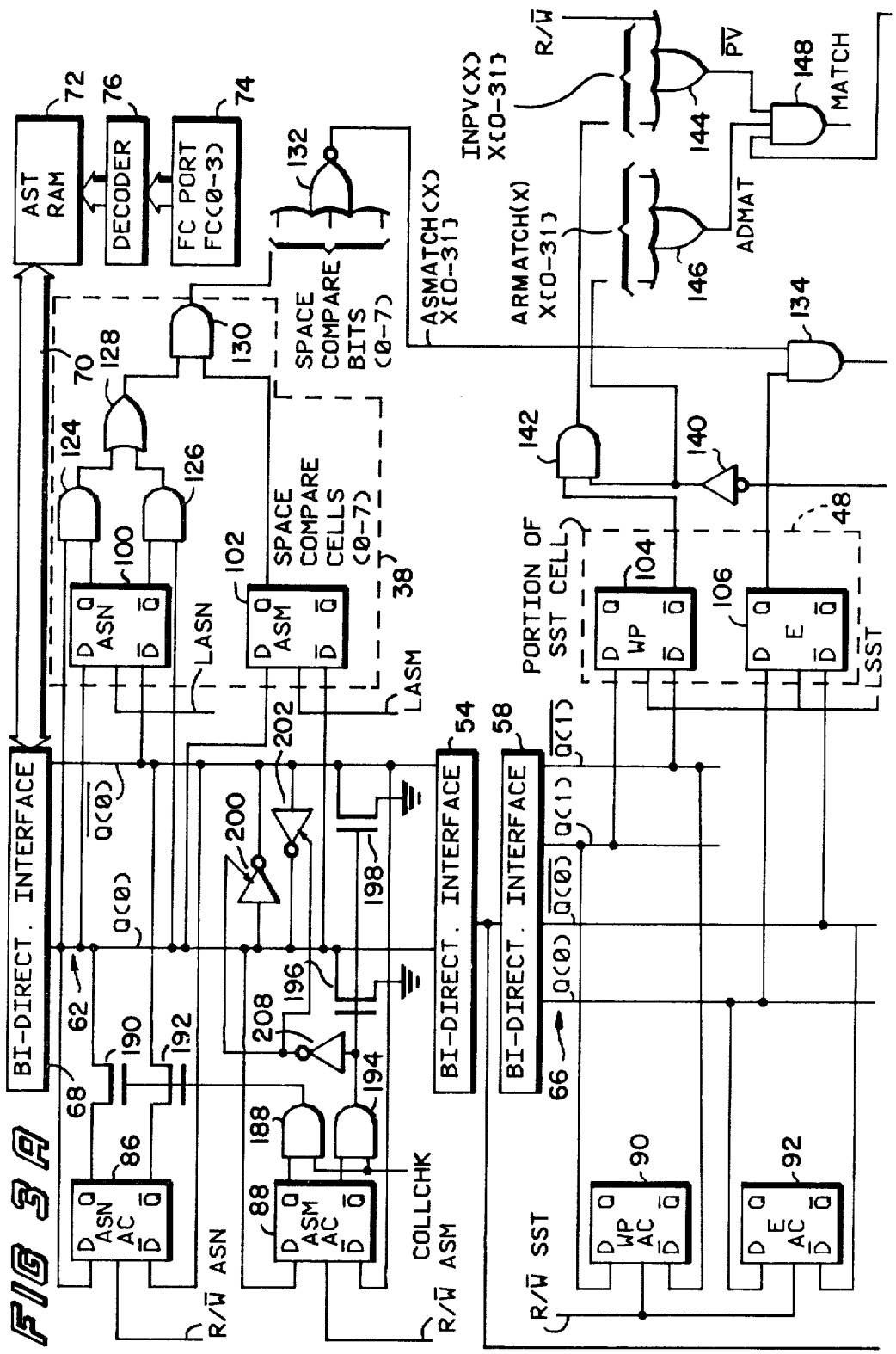

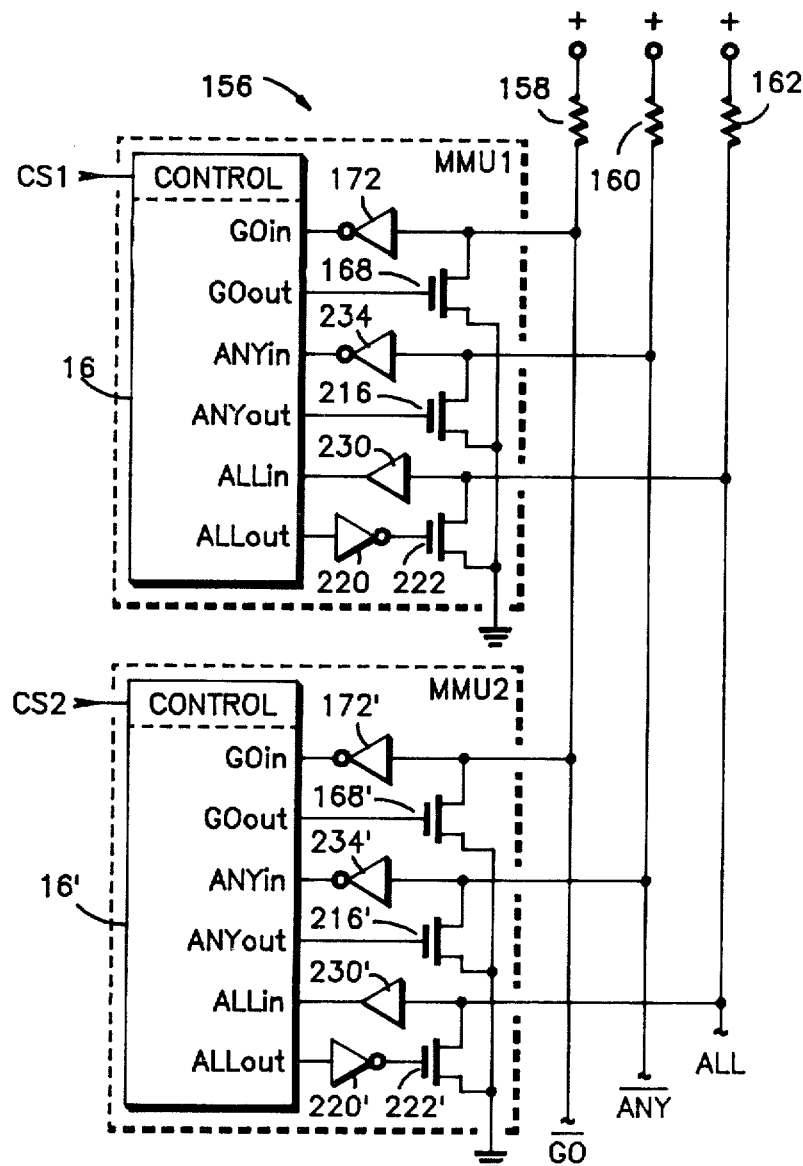

GLOBAL OPERATION COORDINATION METHOD AND CIRCUIT

This application is a continuation-in-part of application Ser. No. 324,183, filed Nov. 23, 1981.

CROSS REFERENCE TO RELATED APPLICATIONS

Related subject matter is disclosed in the following applications filed simultaneously herewith and assigned to the assignee hereof:

1. U.S. Pat. application No. 330,054, entitled AN ASSOCIATIVE MEMORY CIRCUIT, inventors John Edward Zolnowsky, Charles, Lynn Whittington, William Mall Keshlear and Doyle V. McAlister.

2. U.S. Pat. application No. 330,052, entitled A MEMORY MANAGEMENT UNIT, inventors John Edward Zolnowsky, Charles Lynn Whittington and William Mall Keshlear.

3. U.S. Pat. Application No. 330,053, entitled A MEMORY MANAGEMENT UNIT HAVING MULTIPLE ADDRESS SPACES, inventors John Edward Zolnowsky, William Mall Keshlear and Richard DeWitt Crisp.

4. U.S. Pat. Application No. 330,051, entitled A MEMORY MANAGEMENT UNIT HAVING MEANS FOR DETECTING AND PREVENTING MAPPING CONFLICTS, inventors John Edward Zolnowsky, William Mall Keshlear and Richard DeWitt Crisp.

TECHNICAL FIELD

This invention relates generally to global or parallel operating circuitry and, more particularly, to a method and circuit for coordinating the global operations performed by such circuitry.

BACKGROUND ART

In general, the coordination of the operation of a plurality of independent operating units requires communication of a command to each unit which indicates to each unit what operation is to be performed, and a response from each unit which indicates the result of the operation performed. In synchronous systems, the latter can be achieved by simply providing no response if the operation was successful and some response if the operation encountered an exception condition or the like. However, in asynchronous systems, some mechanism must be provided to distinguish the successful response from the state which exists during the performance of the operation. In some systems, a polling technique has been employed to query each unit, either in parallel or in series, to determine the operating condition or result of each, while in other systems distinct signals are provided during the performance of the operation and upon successful completion of the operation. The former technique requires significant time and hardware/software to implement, while the latter often requires additional dedicated signal paths/states.

SUMMARY OF THE INVENTION

Accordingly, it is an object of the present invention to provide an improved method for coordinating global operations and the like.

Another object of the present invention is to provide a circuit for practicing the improved method in a manner which requires a minimum of hardware and dedicated signal paths.

These and other objects of the present invention are achieved in a method for coordinating the parallel operation of a plurality of operating units, each of which performs a respective task which may be subject to the occurance of an exception condition during the performance thereof, comprising the steps of: passively negating an OPERATE signal; passively asserting an ALL signal; passively negating an ANY signal; in each of the operating units, in response to the negation of the OPERATE signal, actively negating the ALL signal; detecting a command signal asserted to a selected one of the operating units, and, in response to detecting the command signal, asserting the OPERATE signal from the selected one of the operating units to each of the operating units; in each of the operating units, in response to the assertion of the OPERATE signal: continuing to actively negate the ALL signal while performing the specified task; and upon performing the task, actively asserting the ANY signal in response to the occurance of the exception condition during the performance of the specified task, and terminating the negation of the ALL signal otherwise; in the selected one of the operating units, providing a first response to the assertion of the ALL signal, and a second response to the assertion of the ANY signal, and negating the OPERATE signal in response to the assertion of either of the ALL and ANY signals; and in each of the operating units, negating the ALL and ANY signals, if asserted, in response to the negating of the OPERATE signal.

BRIEF DESCRIPTION OF THE DRAWINGS

FIGS. 2A–2B, when placed side by side, illustrates a convenient integrated circuit topographic layout for the memory management unit of FIG. 1.

FIGS. 3A–3B, when placed side by side, is a schematic representation of one of the segment mappers in the memory management unit of FIG. 2.

FIG. 4 is a flow diagram illustrating a preferred method for coordinating the simultaneous operation of a plurality of independent operating units, such as the memory management unit of FIGS. 1–3.

DESCRIPTION OF THE PREFERRED EMBODIMENT

Figure 1:
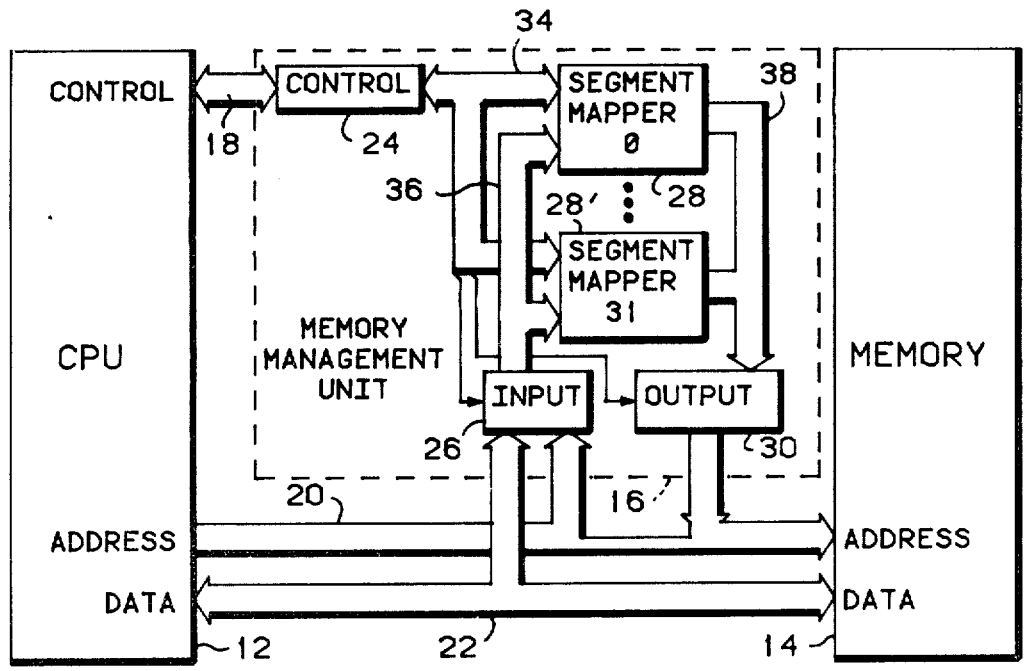
FIG. 1 is a block representation of a memory management system having an associative memory organized as a plurality of segment mappers.

Shown in FIG. 1 is a computing system 10 comprising a processing unit (CPU) 12 which is capable of simultaneously executing an executive program and one or more user programs in a time multiplexed manner, a memory 14 having an available physical address space, and a memory management unit (MMU) 16 which controls access to the blocks or segments of the physical address space allocated by the executive program to itself and the several user programs prior to the execution thereof by the CPU 12. In general, the executive program must construct one or more segment descriptors which map the logical address range of the executive program itself and each of the user programs scheduled to be executed, into appropriately sized segments of the physical address range of the memory 14. The segment descriptors are then transferred to the MMU 16 under control of control signals provided by the CPU 12 on a control bus 18. Thereafter, the MMU 16 automatically intercepts each logical address reference made by the executive or user program as it is issued by the CPU 12 on a logical address portion of an address bus 20, converts the logical address to a corresponding physical address using the appropriate one of the segment descriptors, and provides the resultant physical address to the memory 14 via a physical address portion of the address bus 20. In response to the physical address, the memory 14 provides access, via a data bus 22, to the corresponding storage location therein, for storage or retrieval of data or instructions, as appropriate.

In the illustrated embodiment, a control unit 24 of the MMU 16 responds to certain of the control signals provided by the CPU 12 on the control bus 18 by enabling an input port 26 via an MMU control bus 28 to transfer each segment descriptor provided by the CPU 12 on the data bus 22 into a selected one of a plurality of segment mappers 30-30' via an MMU input bus 32. Typically, each segment descriptor comprises a logical base address portion which defines the lowest logical address which will be mapped by this descriptor, and a physical base address portion which defines the physical address bits which will be substituted for the corresponding bits of the associated logical address. In the illustrated form, each segment descriptor also includes a logical address mask portion which implicitly defines the range of logical addresses to be mapped by this descriptor by specifying which of the bits of the logical address are to be masked prior to comparison to the logical base address. In this form, the physical base address portion effectively defines the physical address into which the bits of the logical address masked by the logical address mask are to be inserted to derive the physical address to be provided to the memory 14.

In the preferred embodiment, the CPU 12 provides on the control bus 18 a function code identifying the type of program requesting a memory access, i.e. executive or user, as well as other information indicating the nature of the memory access currently being performed, e.g., instruction or data, read or write. With this information, it is possible for the MMU 16 to restrict the mapping operation to only that subset of the segment descriptors which are appropriate for the current access. For example, assume that the CPU 12 interacts with the MMU 16 to maintain an address space table which assigns a cycle address space number for each possible function code. In this form, each segment descriptor includes an address space number portion which defines the particular cycle address space number for which the descriptor is to be enabled. In the preferred embodiment, the segment descriptor also includes an address space mask portion which defines which of the bits of the cycle address space number in the address space table are to be compared against the address space number in the segment descriptors, thereby enabling several programs having similar cycle address space numbers to access the same segment when necessary. The segment descriptor may also include a status portion for maintaining information regarding the access activity of the corresponding memory segment, as well as any limitations imposed on access to the memory segment being mapped, such as write protected, etc.

After the segment descriptors required to support the execution of a particular program have been initialized in respective segment mappers 30-30' in the MMU 16, the CPU 12 may access the program instructions and data stored in the memory 14, using the logical memory addresses assigned at the time the program was assembled or compiled. As each access request is issued, the CPU 12 provides a function code identifying the form of the access, so that the control portion 24 of the MMU 16 can select the corresponding cycle address space number to be coupled to the segment mappers 30-30'. The control unit 24 then enables the input port 26 via the MMU control bus 28 to couple the logical address on the logical address portion of the address bus 20 to the segment mappers 30-30' via the MMU input bus 32.

In response to the logical address coupled thereto by the input port 26, each segment mapper 30-30' attempts an address range match by comparing the particular bits in the logical address indicated as being significant by the logical address mask portion of the segment descriptor to the corresponding bits in the logical base address portion of the descriptor. If no address range match is detected, the particular segment mapper 30-30' takes no further action. If an address range match is detected, the successful segment mapper 30-30' constructs a physical address by gating through the bits of the logical address indicated as being insignificant by the logical address mask portion of the segment descriptor but substituting the bits in the physical base address portion of the segment descriptor for the bits of the logical address indicated as being significant by the logical address mask portion.

In response to the cycle address space number coupled thereto by the control unit 24, each segment mapper 30-30' attempts an address space match by comparing the particular bits of the cycle address space number indicated as being significant by the address space mask portion of the segment descriptor to the corresponding bits in the address space number portion of the segment descriptor. If no address space match is detected or if an address space match is detected but not an address range match, the particular segment mapper 30-30' takes no further action. If both an address range match and an address space match are detected, the particular segment mapper 30-30' provides the physical address which has been constructed to an output port 34 via an MMU output bus 36 for coupling to the physical address portion of the address bus 20 in place of the logical address intercepted by the input port 26.

In the preferred embodiment, the successful segment mapper 30-30' also provides a match signal to the control unit 24 indicating that the mapping operation has been successful. If the control unit 24 receives no match signal at the end of any mapping operation, indicating that the logical address is outside the address space defined by the set of segment descriptors assigned to the current cycle address space number, a fault signal is provided to the CPU 12 to initiate remedial action. The fault signal may also be generated if the status information in the successful segment mapper 30-30' indicates an improper condition such as an attempted write to a write protected segment. In the latter event, output of the physical address by the output port 34 will be inhibited.

Shown in FIGS. 2A-2B is a convenient integrated circuit implementation of an MMU 16 capable of handling up to thirty-two (0-31) segment descriptors, but wherein only portions of the first and last segment mappers 30-30' are illustrated by way of example. In the illustrated form, each of the segment mappers 30-30' comprises a set of eight (0-7) space compare cells 38-38' and sixteen (8-23) range compare cells 40-40' which are coupled in parallel through decoder 42 to a state control unit 44 by a cell control bus 46. In addition, each of the segment mappers 30-30' also includes a segment status (SST) register 48 which comprises at least a write protect (WP) cell and a segment enable (E) cell (see FIG. 3). During segment descriptor initialization, each segment descriptor provided by the CPU 12 is coupled via a physical address/data (PA/D) port 50 from the data bus 22 onto a physical address (PA) bus 52. Bi-directional interfaces 54, 56 and 58 selectively couple each portion of the segment descriptor into the appropriate portions of an accumulator register 60. If the segment descriptor is proper, as explained below, the portions of the segment descriptor will be loaded into the space compare cells 38-38', the range compare cells 40-40' and the several cells in the segment status register 48 of an available segment mapper 30-30', via a space bus 62, a range bus 64 and a status bus 66, respectively. Similarly, the various cycle address space numbers provided by the CPU 12 are selectively coupled via a bi-directional interface 68 from the space bus 62 to a cycle address space number (CASN) bus 70, for selective loading into an address space table (AST) RAM 72.

During a mapping operation, a four (4) bit function code (FC) provided by the CPU 12 is coupled via a function code (FC) port 74 from the control bus 18 to a decoder 76 for addressing a particular cycle address space number in the address space table (AST) RAM 72 to be coupled by the interface 68 to the space compare cells 38-38' in each of the segment mappers 30-30' via the space bus 62. Simultaneously, a selected subset of the bits of the "address" on the address bus 20 which comprise a logical address (LA) is coupled by a logical address (LA) port 78 from the address bus 20 to the range compare cells 40-40' in each of the segment mappers 30-30' via the range bus 64. If the segment enable (E) bit in the associated segment enable (E) cell of a segment mapper 30-30' is set, each of the space compare cells 38-38' in the "enabled" segment mapper 30-30' compares the segment descriptor's address space number to the cycle address space number provided by the address space table (AST) RAM 72, and, if an address space match is detected, a respective address space match (ASMATCH) line becomes active. Similarly, each of the range compare cells 40-40' in the "enabled" segment mapper 30-30' compares the segment descriptor's masked logical base address to the masked logical address, and, if an address range match is detected and the associated address space match (ASMATCH) line is active, a respective address range match (ARMATCH) line becomes active. The "enabled" range compare cells 40-40' also generate a corresponding physical address by substituting for the unmasked bits in the logical address the corresponding bits in the physical base address. If the address range match (ARMATCH) line is active, the interface 56 couples the generated physical address onto the physical address (PA) bus 52. If the address range match (ARMATCH) line is active and either the write protect (WP) bit in the write protect (WP) cell is not set indicating that the segment is not write protected or the read/write (R/W) control line indicates a read operation, a match line becomes active, enabling the physical address/data (PA/D) port 50 to couple the physical address from the physical address (PA) bus 52 to the address bus 20. If the match line does not become active, a fault signal is sent to the CPU 12, and the physical address/data (PA/D) port 50 is maintained in the high impedance state.

Figure 3B:
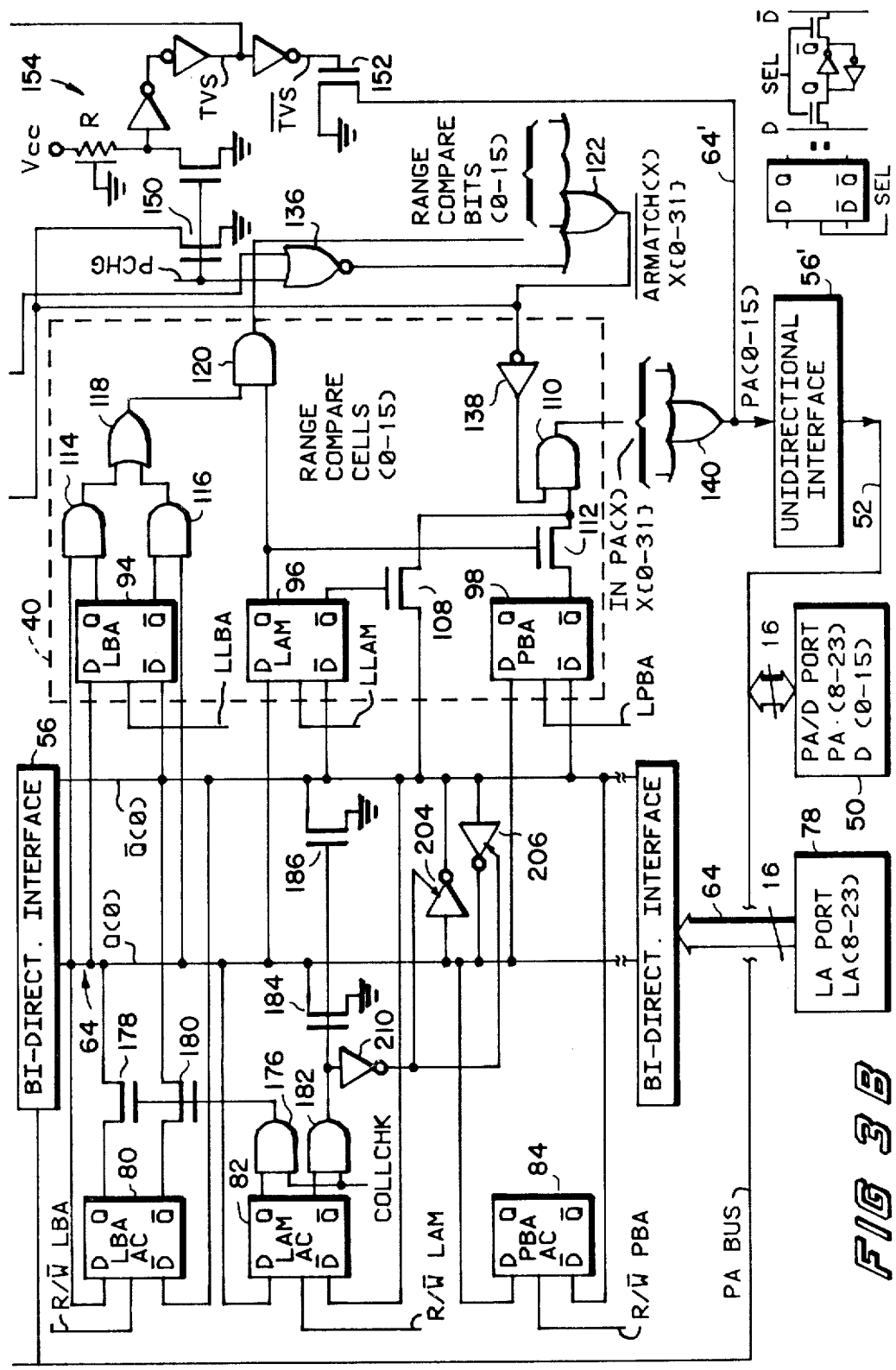

Shown in FIGS. 3A-3B is a schematic diagram of one of the segment mappers 30-30' shown in FIGS. 2A-2B. In the preferred embodiment, each segment descriptor is initially loaded into the accumulator resister 60, and then transferred into a selected one of the segment mappers 30-30'. In particular, each logical base address (LBA) bit is loaded from the range bus 64 into a respective logical base address accumulator (LBA AC) latch 80 in response to a logical base address read/write (LBA R/W) signal coupled to the clock input thereof by the state controller 44 via the decoder 42; each logical address mask (LAM) bit is loaded from the range bus 64 into a respective logical address mask accumulator (LAM AC) latch 82 in response to a logical address mask read/write (LAM R/W) signal coupled to the clock input thereof by the state controller 44 via decoder 42; and each physical base address (PBA) bit is loaded from the range bus 64 into a respective physical base address accumulator (PBA AC) latch 84 in response to a physical base address read/write (PBA R/W) signal coupled to the clock input thereof by the state controller 44 via the decoder 42. In a similar manner, each address space number (ASN) bit is loaded from the space bus 62 into a respective address space number accumulator (ASN AC) latch 86 in response to an address space number read/write (ASN R/W) signal coupled to the clock input thereof by the state controller 44 via decoder 42; and each address space mask (ASM) bit is loaded from the space bus 62 into a respective address space mask accumulator (ASM AC) latch 88 in response to an address space mask read/write (ASM R/W) signal coupled to the clock input thereof by the state controller 44 via the decoder 42. Assuming that the segment status (SST) register is present, each write protect (WP) bit is loaded from the status bus 66 into a respective write protect accumulator (WP AC) latch 90 and each enable (E) bit is loaded from the status bus 66 into a respective enable accumulator (E AC) latch 92 in response to a segment status read/write (SST R/W) signal coupled to the clock inputs thereof by the state controller 44 via the decoder 42.

When the segment descriptor is ready to be loaded into one of the segment mappers 30-30', each logical base address (LBA) bit is coupled onto the range bus 64 by the respective logical base address accumulator (LBA AC) latch 80 in response to the logical base address read/write (LBA R/W) signal, and loaded into a respective logical base address (LBA) latch 94 in response to a load logical base address (LLBA) signal coupled to the clock input thereof by the state controller 44 via the decoder 42. Similarly, each logical address mask (LAM) bit is coupled onto the range bus 64 by the respective logical address mask accumulator (LAM AC) latch 82 in response to the logical address mask read/write (LAM R/W) signal, and loaded into a respective logical address mask (LAM) latch 96 in response to a load logical address mask (LLAM) signal coupled to the clock input thereof by the state controller 44 via the decoder 42. In addition, each physical base address (PBA) bit is coupled onto the range bus 64 by the respective physical base address accumulator (PBA AC) latch 84 in response to the physical base address read/write (PBA R/W) signal, and loaded into a respective physical base address (PBA) latch 98 in response to a load physical base address (LPBA) signal coupled to the clock input thereof by the state controller 44 via the decoder 42.

In a similar fashion, each address space number (ASN) bit is coupled onto the space bus 62 by the respective address space number accumulator (ASN AC) latch 86 in response to the address space number read/write (ASN R/W) signal, and loaded into a respective address space number (ASN) latch 100 in response to a load address space number (LASN) signal coupled to the clock input thereof by the state controller 44 via the decoder 42. likewise, each address space mask (ASM) bit is coupled onto the space bus 62 by the respective address space mask accumulator (ASM AC) latch 88 in response to the address space mask read/write (ASM R/W) signal, and loaded into a respective address space mask (ASM) latch 102 in response to a load address space mask (LASM) signal coupled to the clock input thereof by the state controller 44 via the decoder 42. Finally, the write protect (WP) and enable (E) bits are coupled onto the status bus 66 by the respective latches 90 and 92 in response to the segment status read/write (SST R/W) signal, and loaded into a respective write protect (WP) latch 104 and enable (E) latch 106 in response to a load segment status (LSST) signal coupled to the clock inputs thereof by the state controller 44 via decoder 42.

During a mapping operation, if the bit in the logical address mask (LAM) latch 96 is low, indicating that the corresponding bit in the logical address when provided by the logical address (LA) port 78 on the range bus 64 is insignificant, a gate 108 will be enabled to gate the complement of the logical address bit on range bus 64 to an AND gate 110. If on the other hand the bit in the logic address mask latch 96 is high, indicating that the corresponding logical address bit is significant, a gate 112 will be enabled to gate the complement of the physical base address bit stored in the physical base address (PBA) latch 98 to AND gate 110.

If either the logical address mask bit in the logical address mask (LAM) latch 96 is not set indicating that the corresponding logical address bit is not significant, or EXCLUSIVE OR configured AND gates 114 and 116 and OR gate 118 indicate that the logical address bit on the range bus 64 is the same as the logical base address bit in the logical base address (LBA) latch 94, an AND gate 120 will provide a respective range compare bit in the low state to enable an OR gate 122. On the other hand, if the logical address mask bit is set and the logical address bit does not match the logical base address bit, the AND gate 120 will provide the respective range compare bit in the high state to disable the OR gate 122.

If either the address space mask bit in the address space mask (ASM) latch 102 is not set indicating that the corresponding cycle address space number bit is not significant, or EXCLUSIVE OR configured AND gates 124 and 126 and OR gate 128 indicate that the cycle address space number bit on the space bus 62 is the same as the address space number bit in the address space number (ASN) latch 100, an AND gate 130 will provide a respective space compare bit in the low state to enable a NOR gate 132. On the other hand, if the address space mask bit is set and the cycle address space number bit does not match the address space number bit, AND gate 130 will provide the respective space compare bit in the high state to disable NOR gate 132.

If all of the space compare bits are simultaneously low indicating an address space match condition, NOR gate 132 will provide an address space match (AS-MATCH) signal in the high state. If the enable bit in the enable (E) latch 106 of the same segment mapper 30-30' is also set indicating that the mapper is enabled, an AND gate 134 will provide a map enable (MAPEN) signal via a NOR gate 136 to the OR gate 122. If all of the range compare bits are simultaneously low indicating an address range match condition, and the address space match (ASMATCH) signal is also low indicating an address space match condition and that the mapper is enabled, OR gate 98 will provide an address range match (ARMATCH) signal in the low state.

When the address range match (ARMATCH) signal is low, an inverter 138 enables the AND gate 110 to couple the generated physical address via an OR gate 140 to interface 56' for output to the physical address (PA) bus 52. Similarly, an inverter 140 enables an AND gate 142 to couple the write protect bit from the write protect (WP) latch 104 to an OR gate 144. Simultaneously, an OR gate 146 will provide an address match (ADMAT) signal in a high state in response to the address range match (ARMATCH) signal being high, indicating that one of the segment mappers 30-30' has successfully mapped the logical address to a corresponding physical address.

If either the read/write (R/W) signal provided by the CPU 12 indicates that the current access is a read, or the read/write (R/W) signal indicates that the current access is a write and the write protect bit of the successful segment mapper 30-30' is not set indicating that the segment is not write protected, the OR gate 144 will provide a privilege violation (PV) signal in the high state to enable an AND gate 148 to provide a match (MATCH) signal. If, on the other hand, the read/write (R/W) signal indicates that the current access is a write and the write protect bit is set indicating write protect, the OR gate 144 will provide the privilege violation (PV) signal in the low state to disable the AND gate 148.

When the match (MATCH) signal is high indicating a successful mapping operation without a privilege violation, the control unit 44 (see FIGS. 2A-2B) will enable the physical address/data (PA/D) port 50 to output the physical address on the physical address (PA) bus 52 to the address bus 20 for application to the memory 14. If the match (MATCH) signal is low indicating either that no segment mapper 30-30' was successful or that a privilege violation was detected by the successful segment mapper 30-30', the control unit 44 maintains the physical address/data (PA/D) port 50 in the high impedance state and, in the latter case, may assert a fault signal (not shown) to the CPU 12 if desired.

In the illustrated embodiment, each of the address range match (ARMATCH) lines is precharged low via a respective transistor 150 in response to a precharge (PCHG) signal provided by the control unit 44 before each mapping operation is attempted. Similarly, the output of OR gate 140 is precharged low via a respective transistor 152 in response to a time-of-valid-select (TVS) signal generated by a delay network 154 a short time after the precharge (PCHG) signal goes low. Preferably, the time-to-validate-select (TVS) signal is also coupled to the AND gate 148 to synchronize the generation of the match (MATCH) signal.

In general, any particular implementation of the MMU 16 will have a fixed number of segment mappers 30-30' selected to optimize the control circuit overhead, physical size, power dissipation, etc. For example, the integrated, circuit embodiment of the MMU 16 shown in FIGS. 2A-2B and 3A-3B has thirty-two (32) segment mappers 30-30', each with a respective segment descriptor. However, in a computing system 10 having a large memory 14, a typical program mix could easily require more segment descriptors than are available in a single MMU 16. Whereas it is relatively easy to coordinate the parallel operation of the several segment mappers 30-30' within a single MMU 16, it is somewhat more difficult to coordinate the parallel operation of a plurality of the independently operating MMUs, at least without dedicating an inordinate number of communication lines between the units.

Figure 5:
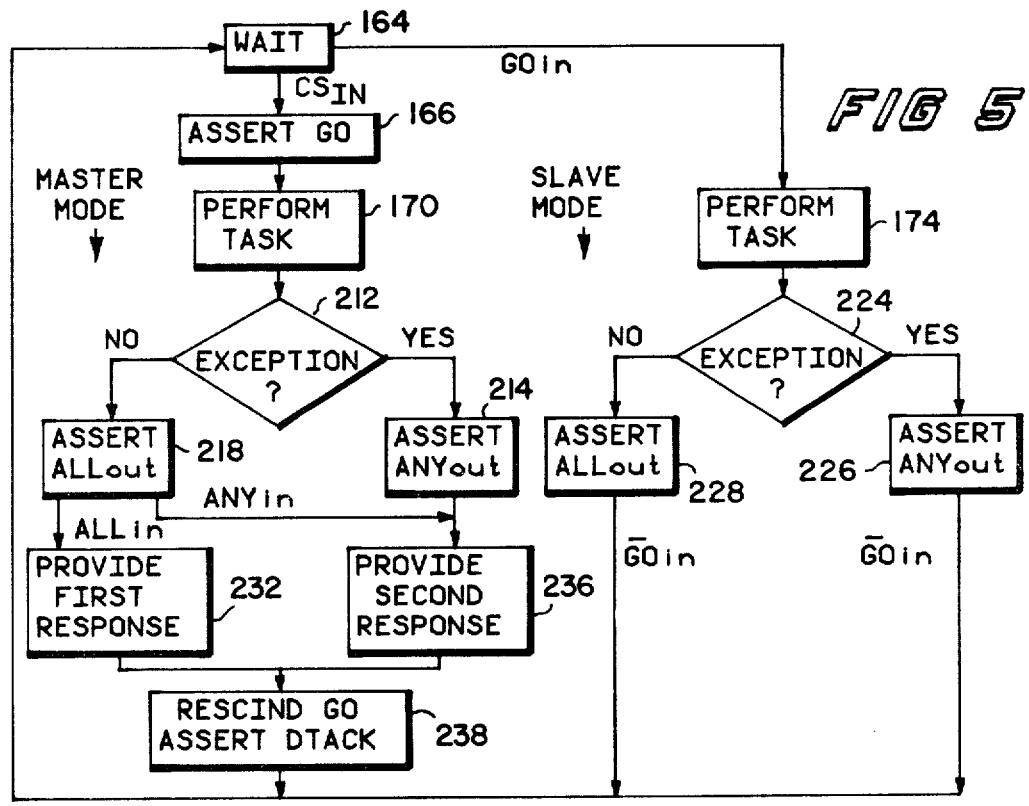
FIG. 5 is a simplified schematic representation of a circuit for practicing the method of FIG. 4.

Shown in FIG. 4 is a flow diagram of a method for controlling the parallel operation of a plurality of operating units, each of which performs a respective task which, as in the case of a segment descriptor load operation in the MMUs 16-16', may be subject to the occurrence of an exception condition during the performance thereof. Shown in FIG. 5 is a global operation circuit 156 which facilitates the practice of the method illustrated in FIG. 4. By way of example, two (2) MMUs 16 and 16' are shown in FIG. 5, although the mechanism works equally well with any number of units.

Upon the application of operating power, a pull-up resistor 158 passively negates an active low global operation (GO) signal, while a pull-up resistor 160 passively negates an active low ANY signal. Similarly, a pull-up resistor 162 passively asserts an active high ALL signal. Simultaneously, each of the MMU's 16-16' initiates the customary power-on/reset sequence wherein the address space table (AST) 72 is cleared to zeroes, and all segment mappers 30-30' are disabled by having the enable (E) bit in their segment status register (SST) 48 cleared. As a part of the power-on/reset sequence, each of the MMUs 16-16' will commence actively negating the ALL signal for reasons made clear hereinafter.

In order to allow the address bus 20 to function before the executive program can initialize the MMU's 16-16', one of the MMU's 16-16' must have a segment mapper 30-30' initialized with an enabled segment descriptor set up to map any received logical address unchanged to the physical address bus. For example, if the MMU 16 in FIG. 4 has its chip select (CS1) signal asserted during power-on/reset, selected or "master" MMU 16 will clear the logical address mask (LAM) of the segment descriptor (0) in the corresponding segment mapper 30 therein to force the mapping of all logical addresses unchanged through the respective range compare cells 40, and will clear the associated address space number (ASN) to zeroes and set the address space mask (ASM) to ones to enable mapping to occur regardless of the function code (FC) on control bus 18. The master MMU 16 will then enable the segment mapper 30 by setting the enable (E) bit in the segment status register (SST) 48 thereof. The master MMU 16 then joins the other MMUs 16' in the idle or wait state (operation 164 in FIG. 4), with the master MMU 16 simply passing all logical addresses which are received from the CPU 12 through to the memory 14.

When memory mapping is desired, the executive program loads the address space table (AST) in each of the MMU's 16-16' with the same set of address space numbers via register commands asserted by the CPU 12 on the low order bits of the address bus 20. Every required segment descriptor is then sequentially loaded into a selected segment mapper 30-30' in one of the MMU's 16-16'. However, since it is imperative for reliable system operation that each logical address map into only a single physical address, each new segment descriptor is checked by each MMU 16-16' prior to actually being loaded to assure that it does not conflict or "collide" with an enabled segment descriptor already loaded in the several segment mappers 30-30' of the MMU's 16-16'. In the preferred embodiment, this "global collision check" is coordinated by the MMU 16-16' having the segment mapper 30-30' into which the executive program desires to load the new segment descriptor.

For example, if the chip select (CS1) signal is asserted upon assertion of a load descriptor operation command on the address bus by the CPU 12, MMU 16 will assume a master role by asserting a global operation output (GOout) signal (operation 166) to enable a transistor 168 to actively assert the global operation (GO) signal. The master MMU 16 then procedes to perform the appropriate task (operation 170), which, in the case of the load descriptor operation, requires the master MMU 16 to perform the global collision check by comparing the segment descriptor which has been loaded by the CPU 12 into the accumulator register 60 therein to each of the enabled segment descriptors in the several segment mappers 30-30' therein. In response to detecting via an inverter 172' the asserted global operation (GO) signal as a global operation input (GOin) signal (see operation 164), the other MMU 16' assumes a slave role and simply proceeds to perform the appropriate task (operation 174), which, as in the case of the master MMU 16, requires the slave MMU 16' to perform the global collision check by comparing the segment descriptor which has been loaded by the CPU 12 into the accumulator register 60 therein to each of the enabled segment descriptors in the several segment mappers 30-30' therein.

At the start of the collision check operation, each MMU 16-16' must synthesize a logical address from the new segment descriptor in the accumulator register 60 therein. Refering again to FIG. 3, if the logical address mask bit in the logical address mask accumulator (LAM AC) latch 82 is high, indicating significance of the respective logical address bit, an AND gate 176 enables gates 178 and 180 to couple the logical base address bit in the logical base address accumulator (LBA AC) latch 80 onto the range bus 64 as if it were an incoming logical address bit. On the other hand, if the logical address mask bit in the logical address mask accumulator (LAM AC) latch 82 is low, indicating insignificance of the respective logical address bit, an AND gate 182 forces each of the complementary bit lines of range bus 64 to the low state via transistors 184 and 186, to "fool" EXCLUSIVE OR configured gates 114-118 into enabling OR gate 122 via AND gate 120. Thus, for the purpose of the collision check operation, only the bits of the logical base address of the new segment descriptor which are indicated as being significant by the bits of the respective logical address mask are actually coupled to the range bus 64 as a "pseudo" logical address, for comparison to the corresponding bits of the logical base address of the stored segment descriptor which are also indicated as being significant by the bits of the respective logical address mask.

Simultaneously, if the address space mask bit in the address space mask accumulator (ASM AC) latch 88 is high, indicating significance of the respective bit of the cycle address space number, an AND gate 188 enables gates 190 and 192 to couple the address space number bit in the address space number accumulator (ASN AC) latch 86 onto the space bus 62 as if it were an incoming cycle address space number bit. On the other hand, if the address space mask bit in the address space mask accumulator (ASM AC) latch 88 is low, indicating insignificance of the respective cycle address space number bit, an AND gate 194 forces each of the complementary bit lines of the space bus 62 to the low state via transistors 196 and 198, to "fool" EXCLUSIVE OR configured gates 124–128 into enabling OR gate 132 via AND gate 130. Thus, for the purpose of the collision check operation, only the bits of the address space number of the new segment descriptor which are indicated as being significant by the bits of the respective address space mask are actually coupled to the space bus 62 as a "pseudo" cycle address space number, for comparison to the corresponding bits of the address space number of the stored segment descriptor which are also indicated as being significant by the bits of the respective address space mask.

If, as in the illustrated form, each of the various latches are configured as relatively weak cross-coupled inverters (see insert in FIG. 3B), the logic states on the space and range buses 62 and 64, respectively, will typically be maintained by conventional means, such as cross-coupled sense amplifiers 200–202 and 204–206, respectively. In this form, inverters 208 and 210 should be provided to disable sense amplifiers 200–202 and 204–206, respectively, when transistors 196–198 and 184–186 are on.

If, during the performance of the global collision check operation, a collision is detected, i.e. the MATCH signal is generated the master MMU 16 executes an exception branch (operation 212), and asserts an ANY output (ANYout) signal (operation 214) to enable a transistor 216 to actively assert the ANY signal. If no collision is detected, the master MMU 16 exits from the exception branch (operation 212) and asserts an ALL output (ALLout) signal (operation 218) via an inverter 220 to disable a transistor 222 and terminate the active negation of the ALL signal. Similarly, if a collision is detected, i.e. the MATCH signal is internally generated, the slave MMU 16' executes an exception branch (operation 224), and asserts the ANY output (ANYout) signal (operation 226) to enable a transistor 216' to actively assert the ANY signal. If, on the other hand, no collision is detected, the slave MMU 16' exits from the exception branch (operation 224), and asserts the ALL output (ALLout) signal (operation 228) via an inverter 220' to disable a transistor 222' and terminate the active negation of the ALL signal.

If none of the MMUs 16-16' detects a collision, the ALL signal will be passively asserted by the resistor 162. In response to detecting via a buffer 230 the asserted ALL signal as an ALL input (ALLin) signal, the master MMU 16 proceeds to load the new segment descriptor from the accumulator register 60 into the selected one of the segment mappers 30-30' therein and notifies the CPU 12 of the successful load by placing all zeroes on the data bus 22 (generally, operation 232). If, on the other hand, one or more of the MMUs 16-16' detects a collision, the ANY signal will be actively asserted. In response to detecting via a buffer 234 the asserted ANY signal, the master MMU 16 aborts the load of the new segment descriptor and notifies the CPU 12 of the collision by placing all ones on the data bus 22 (generally, operation 236). In either event, the master MMU 16 then negates the global operation output (GOout) signal to disable the transistor 168 and allow resistor 158 to passively negate the global operation (GO) signal (operation 238). To speed up the negation of the global operation (GO) signal, the preferred embodiment employs an output buffer of the type disclosed in U.S. patent application Ser. No. 250,522 filed Apr. 2, 1981, entitled "A Three State Output Circuit" and assigned to the assignee hereof. In an asynchronous system, the master MMU 16 may also assert a data transfer acknowledge (DTACK) signal via the control bus 18 to advise the CPU 12 that the requested operation has been performed, and that an indication of the result thereof is on the data bus 22. The master MMU 16 then returns to the wait state (operation 164).

Upon detecting via an inverter 172' the negation of the global operation (GO) signal as the negation of the global operation input (GOin) signal, the slave MMU 16' negates the output signal then being provided. For example, if no collision had been detected, the slave MMU 16' will negate the ALL output (ALLout) signal to reenable via inverter 220' the transistor 222' to again actively negate the ALL signal. On the other hand, if a collision had been detected, the slave MMU 16' will negate the ANY output (ANYout) signal to disable the transistor 216' and terminate the active assertion of the ANY signal. In any event, the slave MMU 16' then joins the master MMU 16 in the wait state (operation 164). Thus, as noted above, the ALL signal will be actively negated by each of the MMUs 16-16' at least so long as the global operation (GO) signal is being passively negated by the resistor 158.

In the load descriptor operation described above, if any of the MMUs 16-16' detected a collision between a new segment descriptor and one of the enabled segment descriptors in the several segment mappers 30-30' therein, the assertion of the ANY signal provides feedback to the master MMU 16 that the new segment descriptor should not be loaded, while the assertion of the ALL signal indicates that the master MMU 16 can safely load the new segment descriptor. Thus, the ANY signal indicates the occurance of the "exception" condition and the ALL signal indicated "normal" completion of the operation. In other operations, however, the sense of the ANY and ALL signals may be reversed. For example, assume that the executive program wishes to obtain the physical address which corresponds to a given logical address in order to perform a particular service request. In response to such a direct translation operation command, the chip-selected master MMU 16, after attempting the translation itself (operation 170), monitors the ANY and ALL signals (operations 214 and 218) to determine the results of the mapping attempts of the slave MMUs 16'. If any one of the MMUs 16-16' is successful in the requested mapping, the ANY signal will be asserted, whereas the ALL signal will be asserted if none is successful. In this latter example, therefore, the ALL signal really indicates the occurance of what would normally be considered to be the "exception" condition, i.e. unsuccessful translation, while the ANY signal indicates "normal" completion, i.e. translation. Note that if the ALL signal were the only signal available to provide feedback to the master MMU 16, the successful slave MMU 16' would simply continue the active negation of the ALL signal, and the master MMU 16 would not be able to distinguish the successful translation from the normal state which exists while the translation operation is still being performed in the slave MMU(s) 16'. In other words, the combination of the ALL and ANY signals allows the master MMU 16 to always determine not only the results of the global operation but also that the requested operation has, in fact, been completed by every slave MMU 16'.

In the normal address translation mode, the CPU 12 presents the logical address on the address bus 20, and the read/write (R/W) signal and function code (FC) on the control bus 18 at the start of a bus cycle. When the CPU 12 asserts an address strobe signal indicating that the logical address is stable, the control unit 24 in each MMU 16-16' couples the appropriate cycle address space number, the logical address, and the read/write (R/W) signal to each of the segment mappers 30-30'. If a segment mapper 30-30' having an enabled segment descriptor is successful in mapping the logical address and no write violation was detected, the resultant physical address is gated out to the address bus 20 and the associated control unit 24 asserts a mapped address strobe to the memory 14 to indicate that the physical address is on the address bus 20. If a successful translation occurred but a write violation was detected, the associated control unit 24 saves the logical address and cycle address space number in the accumulator register 60, together with sufficient status information for the executive program to determine the cause of the fault, and then asserts a fault signal on the control bus 18. Typically, the fault signal is handled as a bus error signal, forcing the CPU 12 into the bus error processing appropriate for such errors. When the CPU 12 negates the address strobe signal as part of the bus error procedure, the MMUs 16-16' return to the wait state.

If none of the segment mappers 30-30' in a particular MMU 16-16' has an address match, the control unit 24 in that MMU 16-16' asserts the ALL output (ALLout) signal, and monitors the mapped address strobe signal, the fault signal, and the ALL input (ALLin) signal. If the mapped address strobe signal is asserted, the logical address was successfully translated by another MMU 16-16', so each unsuccessful MMU 16-16' simply proceeds to negate the ALL output (ALLout) signal and return to the wait state. Similarly, if the fault signal is asserted, a write violation was detected by another MMU 16-16', so each unsuccessful MMU 16-16' returns to the wait state. If the ALL input (ALLin) signal is asserted, no other MMU 16-16' in the system obtained a match, and each MMU 16-16' proceeds generally as in the write violation situation. Thus, in the normal address translation operation, the mapped address strobe and the fault signals, in addition to performing their respective operational functions, serve to indicate to each of the MMUs 16-16' the occurrence of an "exception" condition in one of the other MMUs 16-16', just as the ANY signal did in the other global operations. It is therefore unnecessary to provide the ANY signal in this operation unless otherwise desired.

Since many changes and modifications may be made to the construction or arrangement of the various parts or elements of the embodiments disclosed herein without departing from the spirit and scope of present invention, it is therefore intended that the following claims cover all such changes and modifications.

I claim:

1. A method for coordinating the parallel operation of a plurality of operating units in response to an assertion of a command signal to a selected one of said operating units, each of which performs a respective task which may be subject to the occurance of an exception condition during the performance thereof, comprising the steps of:
    passively negating an OPERATE signal so that said OPERATE signal will be negated whenever said OPERATE signal is not being actively asserted;
    passively asserting an ALL signal so that said ALL signal will be asserted whenever said ALL signal is not being actively negated;
    passively negating an ANY signal so that said ANY signal will be negated whenever said any signal is not being actively asserted;
    in all of said operating units, in response to the negation of said OPERATE signal, actively negating said ALL signal;
    in said selected one of said operating units, detecting said command signal and, in response to detecting said command signal, asserting said OPERATE signal to all of said operating units;
    in all of said operating units including said selected operating unit, in response to the assertion of said OPERATE signal:
        initiating the performance of said respective task;
        continuing to actively negate said ALL signal while performing said respective task; and
        upon performing said task, either actively asserting said ANY signal in response to the occurance of said exception condition during the performance of said respective task, or terminating the negation of said ALL signal in response to the failure of said exception condition to occur during the performance of said respective task;
    in said selected one of said operating units, either providing a first response to an assertion of said ALL signal or a second response to an assertion of said ANY signal, and negating said OPERATE signal in response to an assertion of either of said ALL and ANY signals; and
    in all of said operating units, in response to the negation of said OPERATE signal by said selected one of said operating units, actively negating said ALL signal if said ALL signal is not then being actively negated by said respective operating unit, and terminating the active assertion of said ANY signal if said ANY signal is then being actively asserted by said respective operating unit;
whereby the asserting of said OPERATE signal indicates that all of said operating units are to perform said respective tasks, the asserting of said ANY signal indicates that said exception condition occured during the performance by at least one of said operating units of said respective tasks, and the asserting of said ALL signal indicates that said exception condition failed to occur during the performance by all of said operating units of said respective tasks.

2. A circuit for coordinating the parallel operation of a plurality of operating units in response to an assertion of a control signal to a selected one of said operating units, each of which performs a respective task which may be subject to the occurance of an exception condition during the performance thereof, said circuit comprising:
    first signal generating means for passively negating an operate signal so that said operate signal will be negated whenever said operate signal is not being actively asserted;
    second signal generating means for passively asserting a concurance signal so that said concurance signal will be asserted whenever said concurrance signal is not being actively negated;

third signal generating means for passively negating an exception signal so that said exception signal will be negated whenever said exception signal is not being actively asserted; and in each of said operating units;

first interface means coupled to said first signal generating means, said first interface means having a selectively operable output portion for actively asserting said operate signal in response to an actuation thereof, and a continuously operable input portion for detecting any negation or assertion of said operate signal;

second interface means coupled to said second signal generating means, said second interface means having a selectively operable output portion for actively negating said concurrance signal except in response to an actuation thereof, and a continuously operable input portion for detecting any negation or assertion of said concurrance signal;

third interface means coupled to said third signal generating means, said third interface means having a selectively operable output portion for actively asserting said exception signal in response to an actuation thereof, and a continuously operable input portion for detecting any negation or assertion of said exception signal; and control means coupled to said first, second and third interface means, for operating in a master mode in response to said assertion of said control signal, and in a slave mode in response to said input portion of said first interface means detecting an assertion of said operate signal, said control means, when operating in said master mode:

actuating said output portion of said first interface means to actively assert said operate signal;

enabling said respective operating unit to perform said respective task;

actuating either said output portion of said third interface means to actively assert said exception signal in response to the occurrence of said exception condition during the performance by said respective operating unit of said respective task, or said output portion of said second interface means to terminate the active negation of said concurrance signal in response to the failure of said exception condition to occur during the performance by said respective operating unit of said respective task;

providing either a first output in response to said input portion of said second interface means detecting an assertion of said concurrance signal, or a second output in response to said input portion of said third interface means detecting an assertion of said exception signal;

deactuating said output portion of said first interface means to terminate the active assertion of said operate signal; and in response to said input portion of said first interface means detecting a negation of said operate signal, deactuating said output portion of said second interface means, if said output portion of said second interface means is than being actuated, to terminate the active negation of said concurrance signal and deactuating said output portion of said third interface means, if said output portion of said third interface means is then being actuated, to terminate the active assertion of said exception signal;

and, when operating in said slave mode:

enabling said respective operating unit to perform said respective task;

actuating either said output portion of said third interface means to actively assert said exception signal in response to the occurrence of said exception condition during the performance by said respective operating unit of said respective task, or deactuating said output portion of said second interface means to terminate the active negation of said concurrance signal in response to the failure of said exception condition to occur during the performance by said respective operating unit of said respective task;

in response to said input portion of said first interface means detecting a negation of said operate signal, actuating said output portion of said second interface means, if said output portion of said second interface means is then deactuated, to actively negate said concurrance signal, and deactuating said output portion of said third interface means, if said output portion of said third interface means is then being actuated, to terminate the active assertion of said exception signal.

* * * * *

UNITED STATES PATENT AND TRADEMARK OFFICE
CERTIFICATE OF CORRECTION

PATENT NO. : 4,477,871

DATED : October 16, 1984

INVENTOR(S) : William M. Keshlear

It is certified that error appears in the above-identified patent and that said Letters Patent is hereby corrected as shown below:

On the cover page, category [19] and category [75], please change Keshlear William M. to William M. Keshlear.

Signed and Sealed this

Thirtieth Day of April 1985

[SEAL]

Attest:

DONALD J. QUIGG

Attesting Officer

Acting Commissioner of Patents and Trademarks